United States Patent
Iorga et al.

(10) Patent No.: US 9,948,520 B2
(45) Date of Patent: Apr. 17, 2018

(54) EFFICIENTLY DETERMINING NETWORK TOPOLOGY

(71) Applicant: Lenovo Enterprise Solutions (Singapore) Pte. Ltd., Singapore (SG)

(72) Inventors: Radu Mihai Iorga, Bucharest (RO); Corneliu-Ilie Calciu, Bucharest (RO)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 185 days.

(21) Appl. No.: 15/097,347

(22) Filed: Apr. 13, 2016

(65) Prior Publication Data

US 2017/0302524 A1    Oct. 19, 2017

(51) Int. Cl.
*H04L 12/24* (2006.01)
*H04L 29/12* (2006.01)
*H04L 12/751* (2013.01)

(52) U.S. Cl.
CPC .............. *H04L 41/12* (2013.01); *H04L 41/00* (2013.01); *H04L 45/02* (2013.01); *H04L 61/00* (2013.01)

(58) Field of Classification Search
CPC ......... H04L 41/12; H04L 61/00; H04L 41/00; H04L 45/02
See application file for complete search history.

(56) References Cited

U.S. PATENT DOCUMENTS

| | | | |
|---|---|---|---|
| 5,732,086 A | 3/1998 | Liang et al. | |
| 7,570,603 B2* | 8/2009 | Fan | H04L 29/12009 370/254 |
| 7,843,856 B2* | 11/2010 | Ramakrishnan | H04L 41/0896 370/258 |
| 8,155,030 B2* | 4/2012 | Farkas | H04L 12/462 370/256 |
| 8,683,023 B1* | 3/2014 | Brandwine | H04L 45/64 709/220 |
| 8,989,221 B2* | 3/2015 | Asati | H04L 41/0853 370/252 |
| 9,798,810 B2* | 10/2017 | Wang | H04L 41/12 |

(Continued)

OTHER PUBLICATIONS

Obreja et al., "Web-service solution for inter-domain QoS negotiation", IEEE Computer Socieity, 2008, pp. 95-102.*

(Continued)

*Primary Examiner* — Brian O'Connor
(74) *Attorney, Agent, or Firm* — Jeffrey L. Streets

(57) ABSTRACT

A method allows each individual node in the multi-node computing system to detect the topology of the computing system. Each individual node detects its own connections with neighboring nodes directly connected to the individual node, and sends out a topology packet on all of its interfaces with a local topology change indicator that increments with each topology packet sent out. Each individual node stores their own topology table with an entry for each node from which it has received a topology packet, including the local topology change number which enables the node to determine whether a received topology packet is more recent than data already stored in the topology table. Each node updates its topology table with new topology data, forwards new topology data, and sends back acknowledgements to a source node only upon receiving acknowledgements from all other nodes.

20 Claims, 9 Drawing Sheets

(56) References Cited

U.S. PATENT DOCUMENTS

| | | | | |
|---|---|---|---|---|
| 2010/0054157 A1* | 3/2010 | Farkas | ............... | H04L 12/462 |
| | | | | 370/256 |
| 2011/0080854 A1* | 4/2011 | Farkas | ............... | H04L 12/462 |
| | | | | 370/256 |
| 2012/0044837 A1* | 2/2012 | Ibanez Fernandez | .. | H04L 45/02 |
| | | | | 370/256 |
| 2012/0170489 A1* | 7/2012 | Farkas | ............... | H04L 12/462 |
| | | | | 370/256 |
| 2012/0224510 A1* | 9/2012 | Bulusu | ............... | H04L 45/02 |
| | | | | 370/256 |
| 2015/0249573 A1* | 9/2015 | Miller | ............... | H04L 41/0816 |
| | | | | 709/221 |
| 2015/0257081 A1* | 9/2015 | Ramanujan | ............... | H04L 45/125 |
| | | | | 370/329 |
| 2016/0119188 A1* | 4/2016 | Kumbhari | ............... | H04L 49/90 |
| | | | | 370/400 |
| 2016/0165326 A1* | 6/2016 | Srinivas | ............... | H04Q 3/0083 |
| | | | | 398/48 |
| 2017/0245285 A1* | 8/2017 | Palin | ............... | H04L 45/02 |
| 2017/0295067 A1* | 10/2017 | Bae | ............... | H04L 41/12 |

OTHER PUBLICATIONS

Cornell Network Research Group, "Project Argus—Network topology discovery, monitoring, history, and visualization", Network Topology Discovery, https://www.cs.cornell.edu/boom/1999sp/projects/Network Topology/top . . . , Feb. 11, 2016, 4 pages.

* cited by examiner

Topology Table – Node E

| Node ID | Local Topology Change Indicator (LTCI) | Direct Connections (Neighboring Node ID; Individual Node Interface ID; Neighboring Node Interface ID; ACK/NOACK Received) | | |
|---|---|---|---|---|
| A | 12 | B;1;3;ACK | D;4;2;ACK | |
| B | 14 | A;3;1;ACK | E;4;2;ACK | C;1;3;ACK |
| C | 25 | B;3;1;ACK | F;4;2;ACK | |
| D | 6 | A;2;4;ACK | E;1;3;ACK | G;4;2;ACK |
| E | 23 | B;2;4;ACK | F;1;3;ACK | H;4;2;ACK | D;3;1;ACK |
| F | 19 | C;2;4;ACK | E;3;1;ACK | I;4;2;ACK |
| G | 13 | D;2;4;ACK | H;1;3;ACK | |
| H | 5 | E;2;4;ACK | G;3;1;ACK | I;1;3;ACK |
| I | 17 | F;2;4;ACK | H;3;1;ACK | |

FIG. 2

EFFICIENTLY DETERMINING NETWORK TOPOLOGY

BACKGROUND

Field of the Invention

The present invention relates to a method for determining the network topology of the computing system including a plurality of compute nodes.

Background of the Related Art

A multi-node system including a plurality of compute nodes may be configured in many different ways depending upon the various connections between compute nodes. For example, a network topology may form a linear topology, ring topology, start topology, a partially or fully connected mesh topology, or a hybrid topology. However, in order to maximize the efficiency of communication between nodes it is necessary for each of the nodes to have access to a description of the logical network topology within the multi-node system. For example, one of the individual compute nodes may communicate with another compute node over a direct connection rather than an indirect connection through one or more other compute nodes.

Furthermore, the network topology within a multi-node system may change over time as nodes are added, removed, or suffer a node failure or a connection failure. Accordingly, it is important for the node to have access to an accurate and current description of the logical network topology over time. This objective becomes complex as the number of nodes in the computing system increases. Accordingly, it is desirable to have a method for determining network topology that is both fast and efficient.

BRIEF SUMMARY

One embodiment of the present invention provides a method that enables an individual compute node in a multi-node system to detect a network topology of the multi-node system. The method comprises each individual node in the multi-node network detecting a connection for each neighboring node that is directly connected to one of a plurality of interfaces of the individual node and identifying the neighboring node and a neighboring node interface enabling the connection. The method further comprises each individual node storing a local topology change indicator that is incremented every time the individual node detects a change in any said connection. In addition, each individual node generates and sends an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node. Each individual node stores a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet. Still further, the method includes each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

Another embodiment of the present invention provides a computer program product for enabling individual compute nodes in a multi-node system to detect a network topology of the multi-node system, where the computer program product comprises a non-transitory computer readable storage medium having program instructions embodied therewith, and wherein the program instructions are executable by a processor to cause the processor to perform a method. The method comprises each individual node in the multi-node network detecting a connection for each neighboring node that is directly connected to one of a plurality of interfaces of the individual node and identifying the neighboring node and a neighboring node interface enabling the connection. The method further comprises each individual node storing a local topology change indicator that is incremented every time the individual node detects a change in any said connection. In addition, each individual node generates and sends an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node. Each individual node stores a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet. Still further, the method includes each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

BRIEF DESCRIPTION OF THE SEVERAL VIEWS OF THE DRAWINGS

FIG. 2 is a topology table for one of the nodes of the computing system after the topology of the computing system has been fully determined and has become stable.

DETAILED DESCRIPTION

Figure 1:
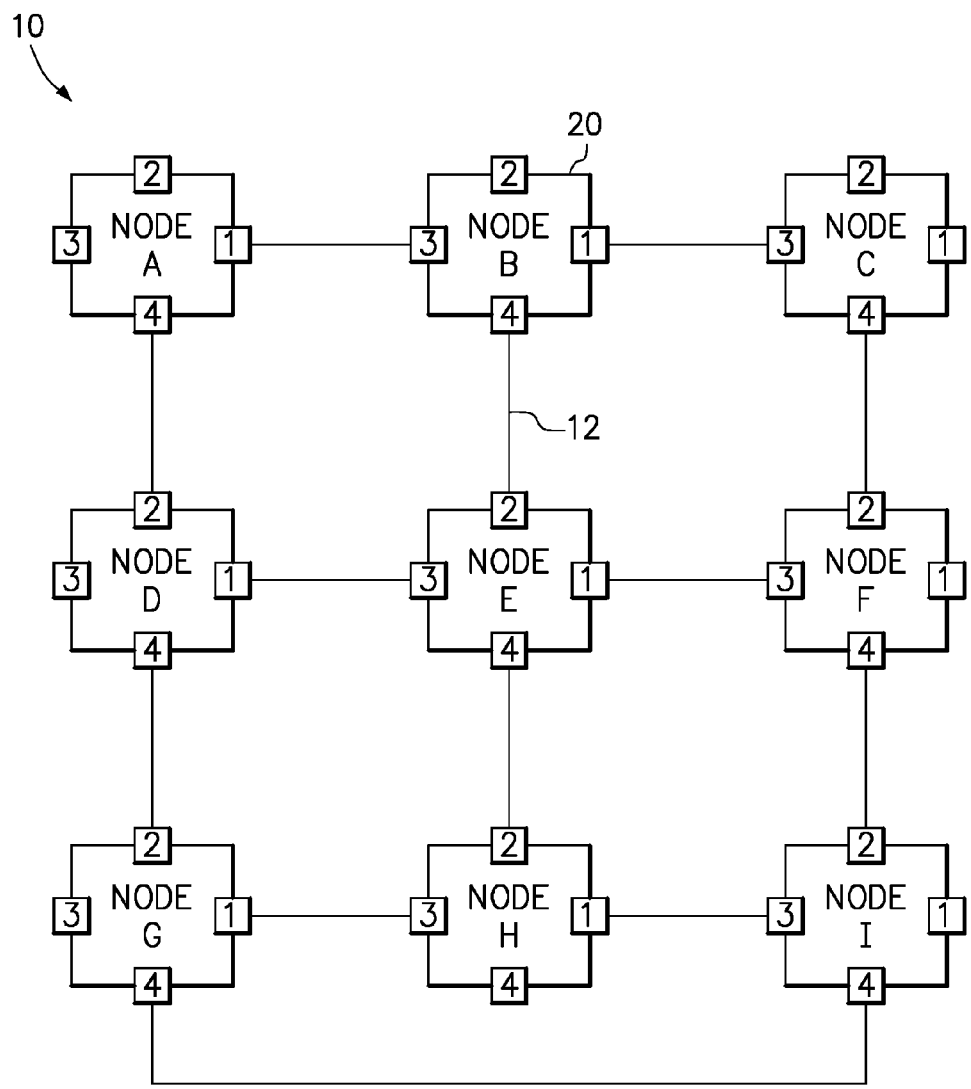
FIG. 1 is a diagram a computing system including a plurality of interconnected nodes.

One embodiment of the present invention provides a method that enables an individual compute node in a multi-node system to detect a network topology of the multi-node system. The method comprises each individual node in the multi-node network detecting a connection for each neighboring node that is directly connected to one of a plurality of interfaces of the individual node and identifying the neighboring node and a neighboring node interface enabling the connection. The method further comprises each individual node storing a local topology change indicator that is incremented every time the individual node detects a change in any said connection. In addition, each individual node generates and sends an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node. Each individual node stores a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet. Still further, the method includes each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

Each connection with a neighboring node that is directly connected to one of a plurality of interfaces of the individual node may be detected in various manners. For example, the individual node may send an individual node identifier over each of the interfaces of the individual node, and receive a response from each neighboring node connected to one of the interfaces of the individual node, wherein each response identifies the neighboring node and the neighboring node interface that enables the connection. Accordingly, the individual node has enough topology data to describe the connection in a topology packet and the topology table of the individual node. Optionally, the individual node may further send an interface identifier of the individual node along with the individual node identifier, such that the neighboring node will also have enough topology data to store the fully characterized connection in its own topology table. In one example, the node identifier may be a media access control address.

The method uses a local topology change indicator (LTCN) to limit the propagation of topology data that is no longer current. The local topology change indicator enables each individual node to determine what topology packet or data is the most recent topology packet generate by a given node. Specifically, each individual node has its own local topology change indicator that is incremented every time the individual node detects a change in any direct connection of the individual node. For example, an individual node has a local topology change indicator that is incremented each time a connected neighboring node is added or removed, or the neighboring node suffers a node failure or a connection failure. Accordingly, a received topology packet may be identified as being the most recent topology packet that the individual node has received from the associated node that generated the topology packet in response to the value of the local topology change indicator in the topology packet being greater than (or subsequent to) a local topology change indicator value stored in the topology table of the individual node in association with the node that generated the topology packet. It is important to understand that "most recent" is determined from the perspective of when the topology data was generated and sent by the generating node, not from the perspective of when the topology packet was eventually received by another node. In other words, the "most recent" topology packet is a packet that was "most recently" generated by the generating node among all packets that the individual node has received from the generating node. Therefore, the local topology change indicator is determinative of the order in which a given node has generated topology packets, and there is no need for a receiving node to determine the order in which topology packets are actually received. Furthermore, the term "increment" should be understood to mean some advance in a predetermined pattern, but the pattern is not limited to an ascending numerical pattern or a descending numerical pattern. For example, the local topology change indicator could be a function of the time and date of the generated topology packet or any predetermined pattern of special or alphanumerical characters.

According to the method, each individual node generates and sends an individual node topology packet over each connection with a neighboring node in response to detecting a change in any connection. During initial startup of a computing system, the topology table of the individual node may be empty, such that the detection of each connection with a neighboring node is considered a change relative to content of the topology table. After a connection has been detected, a subsequent change in the connection may include a failure of the neighboring node, failure of the connection, or removal of the neighboring node. Furthermore, when a new neighboring node is connected to an existing node, either or both nodes may detect the new connection and treat that new connection as a change.

Each topology packet generated by an individual node will include topology data identifying, for each connection between the individual node and a neighboring node, the individual node interface, the individual node, the neighboring node interface, the neighboring node, and a current value of the local topology change indicator for the individual node. However, the number of connections is only limited by the number of network interfaces that are provided by the individual node. For example, an individual node in a ring or linear topology may require only two network interfaces, whereas an individual node in a large fully meshed network topology may require many more interfaces. Regardless of the exact number, a topology packet will preferably identify the same basic information for each connection. In the present examples, each connection is fully characterized by identifying the individual node interface, the individual node, the neighboring node interface, and the neighboring node. Furthermore, in accordance with various embodiments of the present invention, each topology packet will also include a current value of the local topology change indicator for the individual node.

Each individual node stores a topology table including an entry associated with the individual node and an entry associated with each other node in the multi-node system from which the individual node has received a topology packet. Accordingly, a complete topology table will include one entry (or record) for each node in the multi-node system, wherein each record includes a variable number of fields depending upon the number of connections established by the individual node plus an additional field for the most recent local topology change indictor. Each connection field may identify the individual node interface, the individual node, the neighboring node interface, and the neighboring node. Therefore, each entry stores the topology data from the most recent topology packet that the individual node has originated and sent to neighboring nodes or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet.

In response to receiving a topology packet from a neighboring node, an individual node must identifying whether the topology packet is the most recent topology packet that the individual node has received from the node that generated the topology packet. If the topology packet is identified as being the most recent topology packet, then the individual node will update its own topology table in order to reflect the topology data in the topology packet, and forward the topology packet on all connections except the connection to the neighboring node that is the source of the topology packet. In this manner, the topology table of the individual node is updated with the most current topology data that has as yet been received by the individual node, and the individual node shares this new topology data with neighboring nodes, which subsequently handle the topology packet in a similar manner.

In another embodiment, the method may further comprise each individual node sending an acknowledgment to a neighboring node that was the source of a most recent topology packet in response to the individual node receiving an acknowledgement from all neighboring nodes to which the individual node forwarded the new information. Accordingly, as a node receives a topology packet from a source node and forwards the topology packet to multiple neighboring nodes, the node will later aggregate acknowledgements from the multiple neighboring nodes prior to sending an acknowledgement back to the source node. Furthermore, each individual node may track each topology packet that has been sent or forwarded over each connection with a neighboring node and tracking acknowledgements received over each connection with a neighboring node. In this manner, the individual node can determine what acknowledgements are still pending at any point in time. The method may then identify that the topology table of an individual node is completed in response to having received an acknowledgement for each topology packet sent or forwarded.

In a further embodiment of the method, each individual node may resend the topology packet in response to having not received an acknowledgement from a neighboring node during a timeout period following the individual node sending the topology packet to the neighboring node. Optionally, each individual node may then determine that the individual node is no longer connected to the neighboring node in response to resending the topology packet to the same neighboring node more than a predetermined number of times without receiving an acknowledgement.

In a still further embodiment of the method, each individual node may, in response to receiving a topology packet that is determined to not be a most recent topology packet received from the node that generated the topology packet, send an acknowledgement to a neighboring node that was the source of a topology packet without updating the topology table of the individual node and without forwarding the topology packet. In other words, a topology packet that is not the most recent (i.e., is outdated by data already in the topology table) may be ignored without revision to the topology table. An acknowledgement may be returned to the source node simply so that the neighboring node will no longer show the acknowledgement as pending.

In additional embodiments of the method, an individual node may receive a topology packet that is identified as a most recent topology packet that the individual node has received from the node that generated the topology packet and determine that the received topology packet includes only topology data that is already stored in the topology table of the individual node. In response to this situation, the individual node may send an acknowledgement to a neighboring node that was the source of the topology packet without updating the topology table of the individual node and without forwarding the topology packet.

In another embodiment of the method, each individual node may, in response to detecting a new connection with a new neighboring node on one of the interfaces of the individual node, send the topology table of the individual node over the new connection to the neighboring node, receive an acknowledgement from the neighboring node along with a neighboring node identifier and a neighboring node interface identifier for the interface that enables the connection, update the topology table of the individual node with an entry for the new neighboring node, and forward a topology packet identifying the new connection to all neighboring nodes except the new neighboring node. While similar to other situations, the new neighboring node may not have any entries in its topology table since it has only now been connected as a node in the multi-node system. Accordingly, the individual node sends its entire topology table.

In yet another embodiment of the method, each individual node may, in response to detecting loss of a connection that is already identified in the topology table of the individual node, remove topology data that identifies the lost connection from the topology table of the individual node, and send a topology packet to all neighboring nodes identifying the current topology data of the individual node. It should be recognized that the loss of a connection between two nodes may result in both nodes taking these actions. Optionally, if the individual node is waiting for an acknowledgement from a neighboring node associated with the connection at the time that the connection is lost, then the individual node may consider the acknowledgement as having been received and forward the acknowledgement if the individual node did not generate the topology packet associated with the acknowledgement.

In a further embodiment, the method may further comprise an individual node receiving a most recent topology packet generating by a node while an acknowledgement is still pending from a previous topology packet generated by the same node and, in response thereto, forwarding the most recent topology packet to all neighboring nodes except the neighboring node that sent the topology packet without waiting for an acknowledgement of the previous topology packet. In other words, since the previous topology packet has now been superseded with a most recent topology packet, there is no need to continue waiting for an acknowledgment with respect to the previous topology packet.

In a still further embodiment, the method may further comprise each individual node, in response to determining that the topology table of the individual node is complete, determining whether there are any nodes that no longer exist in the multi-node system and deleting any entry in the topology table of the individual node that identifies any node that is determined to no longer exist in the multi-node system.

Another embodiment of the present invention provides a computer program product for enabling individual compute nodes in a multi-node system to detect a network topology of the multi-node system, where the computer program product comprises a non-transitory computer readable storage medium having program instructions embodied therewith, and wherein the program instructions are executable by a processor to cause the processor to perform a method. The method comprises each individual node in the multi-node network detecting a connection for each neighboring node that is directly connected to one of a plurality of interfaces of the individual node and identifying the neighboring node and a neighboring node interface enabling the connection. The method further comprises each individual node storing a local topology change indicator that is incremented every time the individual node detects a change in any said connection. In addition, each individual node generates and sends an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node. Each individual node stores a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet. Still further, the method includes each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

The foregoing computer program products may further include program instructions for implementing or initiating any one or more aspects of the methods described herein. Accordingly, a separate description of the methods will not be duplicated in the context of a computer program product.

FIG. 1 is a diagram a computing system 10 including a plurality of interconnected nodes 20. This example includes nine individual compute nodes (Node A through Node I) connected in a hybrid topology. Each node 20 includes four network interfaces that are available for forming a connection 12 with a neighboring node, although not every node is using each of its interfaces. As used herein, the term "neighbor node" refers to a node connected one link away from another node. Each node has a unique identifier (e.g. A-I) and each network interface of a given node has a unique identifier (e.g. 1-4).

FIG. 2 is a topology table 14 for one of the nodes (Node E of FIG. 1) of the computing system 10 after the topology of the computing system has been fully determined and has become stable. Accordingly, the table 14 identifies each of the connections shown in FIG. 1. In this example, the table includes a first column including the Node ID and a row (record) for each of the nodes in the computing system. Each row (record) identifies the Node ID, a local topology change indicator (LTCI), a one or more direction connections. Here, each connection is described by a Neighboring Node ID, an Individual Node Interface ID, a Neighboring Node Interface ID, and an indication whether an acknowledgement (ACK) has been received from the neighboring node. For example, the code ACK may indicate that an acknowledgement has been received, while the code NOACK may indicate that an acknowledgement has not been received. In table 14, the topology table is complete because there are no acknowledgements pending.

The number of direct connections varies from node to node, as required to accurately reflect the topology of the computing system 10 in FIG. 1. For example, the topology table 14 includes an entry (record) for Node A that describes a first connection with Node B (Node A, Interface 1 is connected to Node B, Interface 3) and a second connection with Node D (Node A, Interface 4 is connected to Node D, Interface 2). Node A does not presently have any further connections. By contrast, the topology table 14 includes an entry (record) Node E that describes four connections with its neighboring nodes (B, D, F and H).

Each node is responsible for detecting its own connections and generating its own topology data that is shared with other nodes via sending a topology packet. As the topology for a given node changes via additional connections, removed connections, failed connections or failed neighboring nodes, the individual node will change its topology data and resend a current topology packet. Each time that the topology data changes and a new topology packet is sent, the individual node will also increment a value of a local topology change indicator (LTCI). As shown, the topology table 14 stores the local topology change indicator associated with the topology data describing the direct connections of each node, such that the individual node can later determine whether a received topology packet includes topology data that is more recent (i.e., more recently generated) than the topology data already stored in the topology table. If the local topology change indicator in a topology packet is subsequent to that stored in the table (i.e., has a higher value in an ascending numerical indicator patter), then the topology data in the record associated with the node that generated the topology packet is updated.

Figure 3:
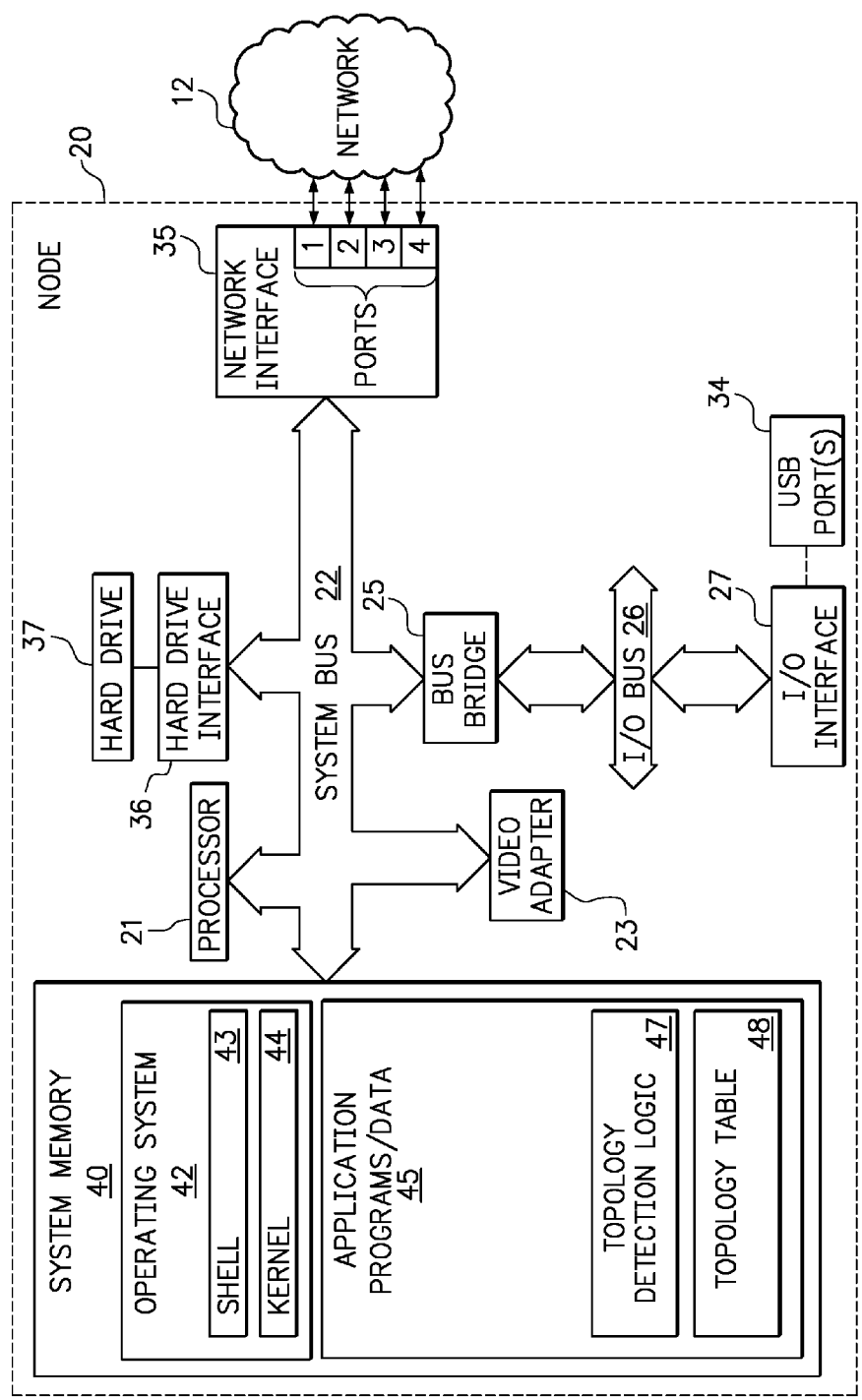
FIG. 3 is diagram of an individual compute node within the computing system.

FIG. 3 is diagram of an individual compute node 20 that is capable of implementing the methods of the present invention. In this non-limiting example, the compute node 20 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and may provide communication with various I/O devices, such as a keyboard, mouse, media tray (which may include storage devices such as CD-ROM drives, multi-media interfaces, etc.), printer, and USB port(s) 34. As shown, the compute node 20 is able to communicate with other network devices, such as another compute node, via the network 12 using a network adapter or network interface controller 35.

A hard drive interface 36 is also coupled to the system bus 22. The hard drive interface 36 interfaces with a hard drive 37. In a preferred embodiment, the hard drive 37 communicates with system memory 40, which is also coupled to the system bus 22. System memory includes the lowest level of volatile memory in the compute node 20. This volatile memory may include additional higher levels of volatile memory (not shown), including, but not limited to, cache memory, registers and buffers. Data that populates the system memory 40 includes the operating system (OS) 42 and application programs 45.

The operating system 42 includes a shell 43 for providing transparent user access to resources such as application programs/data 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs/data 45, including memory management, process and task management, disk management, and mouse and keyboard management. The application programs/data 45 in the system memory of the compute node 20 may include, without limitation, topology detection logic 47 and a topology table 48, in accordance with various embodiments of the present invention.

The hardware elements depicted in the compute node 20 are not intended to be exhaustive, but rather are representative. For instance, the compute node 20 may include alternate memory storage devices such as magnetic cassettes, digital versatile disks (DVDs), Bernoulli cartridges, and the like. These and other variations are intended to be within the scope of the present invention. Furthermore, the structure of the computer 20 is representative of various nodes or computing systems disclosed herein. For example, the computer 20 may be a compute node in the computing system 10 of FIG. 1.

Figure 4:
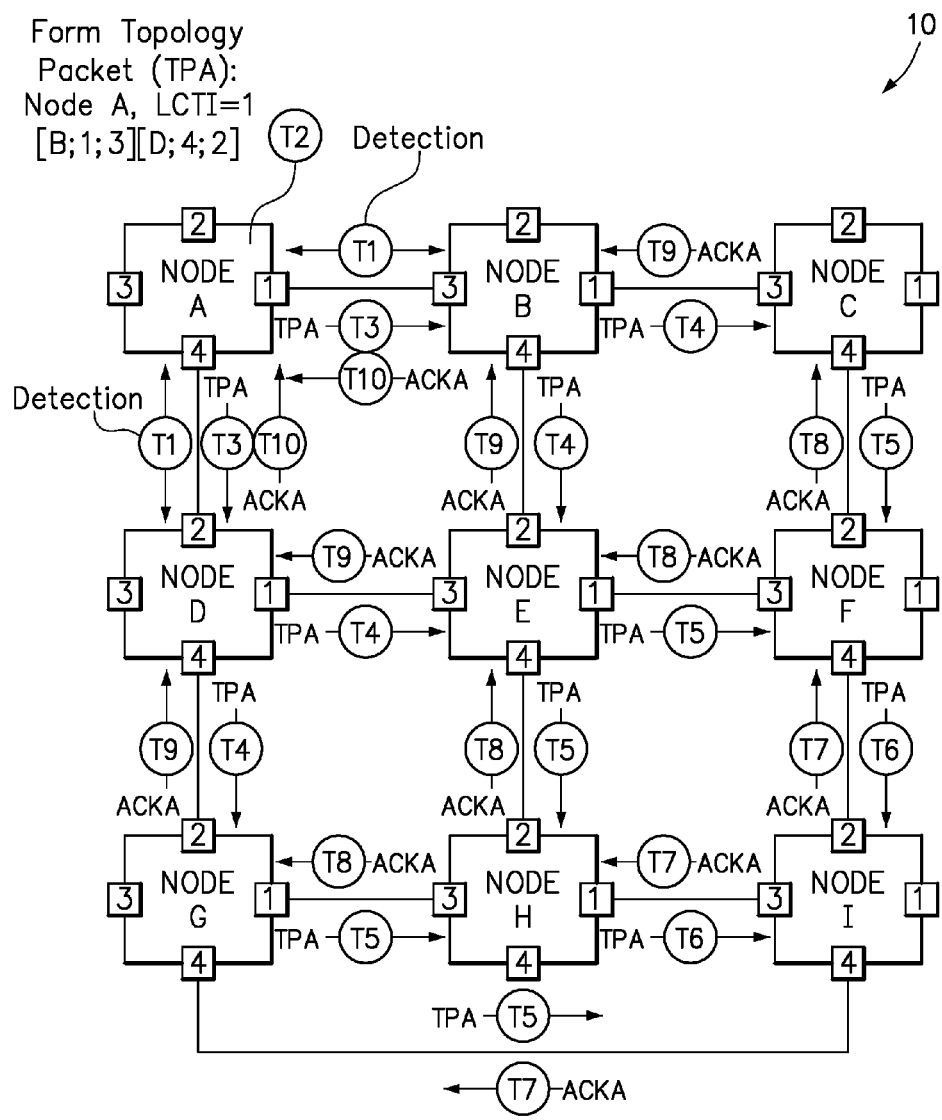
FIG. 4 is a diagram of the computing system illustrating the stepwise propagation of the topology packet from Node A and the stepwise return of acknowledgements to Node A.

FIG. 4 is a diagram of the computing system 10 illustrating the stepwise propagation of a topology packet from Node A and the stepwise return of acknowledgements to Node A. A series of time indicators (T1-T10) are used to identify a possible sequence of events over time, although it is not intended to imply equal time periods or that no delays might occur. While the diagram is specific to the details of Node A, it is representative of the process that will occur for each of the nodes in the computing system.

At time T1, Node A detects and identifies its directly connected neighboring nodes, Node B and Node D. At time T2, Node A forms a topology packet "Node A, LCTI=1, [B;1;3][D;4;2]" that identifies the connections detected with Nodes B and D. Then, at time T3, Node A sends the topology packet (TPA) over the connected interfaces to the neighboring nodes B and D. At time T4, Nodes B and D independently store the topology data in their own topology tables (not show) and forward the topology packet to their own neighboring nodes that were not the source of the topology packet, collectively Nodes C, E and G The topology packet continues to be propagated through the network at Times T5 and T6.

As each node receives the topology packet (TPA), the individual nodes will compare the local topology change indicator (LTCI) in the topology packet with the value of the local topology change indicator (LTCI) stored in the topology table of the individual node, and will only update the topology table if the data is the most recent data that the individual nodes has yet received. If the individual node already has an entry in the network topology table for a given remote node with a greater LTCI, then the individual node will not store the topology packet data for the remote node since the data is older. A topology acknowledgement packet will be sent back in this case, and the topology table packet will not be forwarded or processed. However, if the topology packet has the same or newer LTCI than in the topology table and if the topology data for the remote node is the same as already stored in the topology table, then the individual node will not forward the topology packet but may send back an acknowledgement to the node that sent the topology packet.

Each node will send an acknowledgment to the source node of a topology packet once the node has no acknowledgements pending for that same topology packet. Here, Node I receives the topology packet for Node A (TPA) at time T5 from Node and receives the topology packet for Node A (TPA) at time T6 from both Node F and Node H. Accordingly, Node I does not need to forward the topology packet (TPA) to any other nodes. Therefore, Node I does not need any acknowledgements, and Node I is able to send back an acknowledgement with respect to the topology packet from Node A (ACKA) to Nodes F and H at time T7. The acknowledgements propagate back through the nodes of the computing system 10 until Node A receives acknowledgements back from Node B and Node D at time T10.

Figure 5:
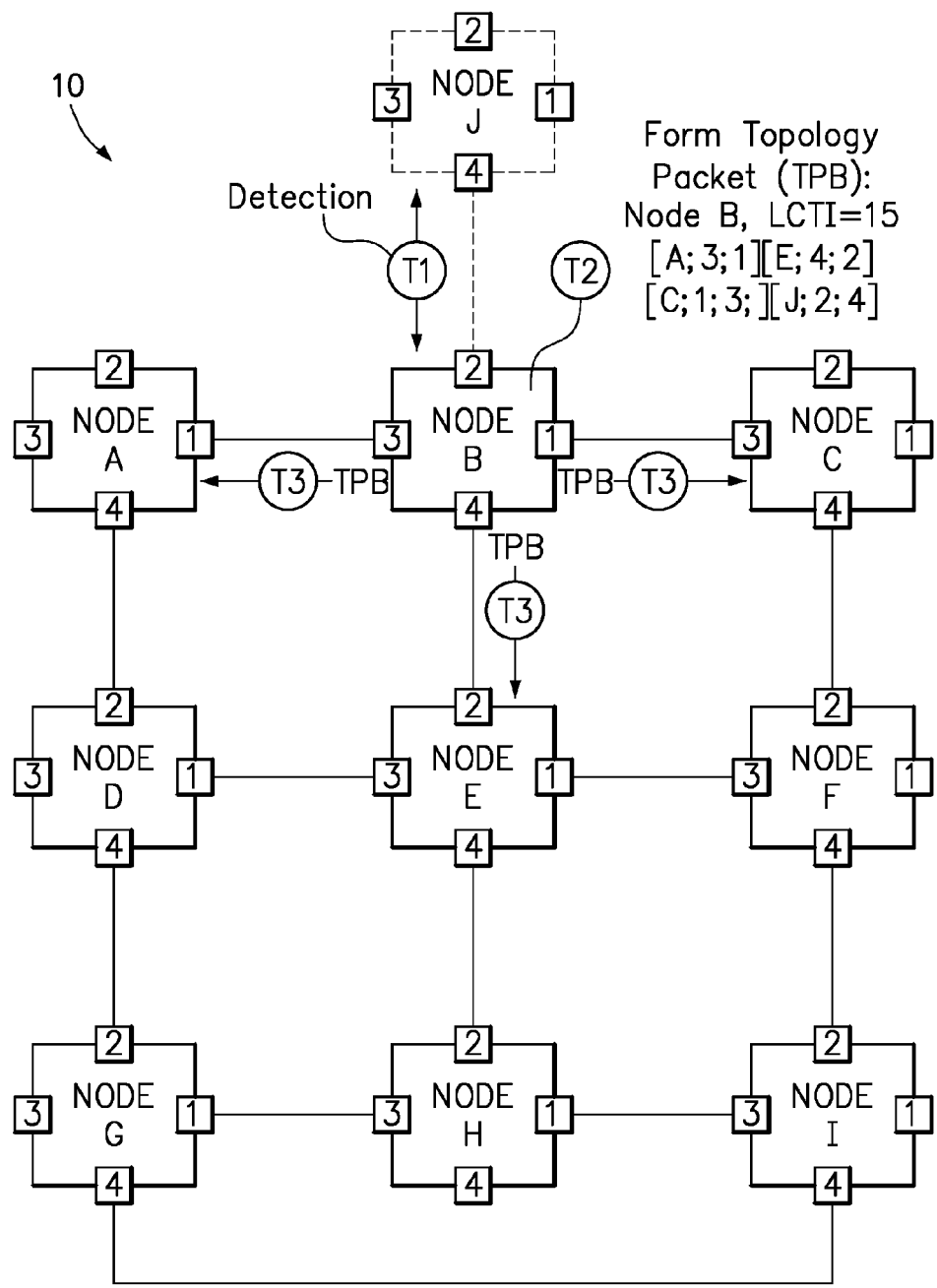
FIG. 5 is a diagram of the computing system illustrating the initial steps of detecting a newly connected node and propagating a topology packet following detection of an additional Node J connected to Node B.

FIG. 5 is a diagram of the computing system 10 illustrating the initial steps of detecting a newly connected node (Node J) and propagating a topology packet following detection of an additional Node J connected to Node B. At time T1, Node B detects a connection with Node J and exchanges node and interface identifiers. At time T2, Node B forms, or modifies, a topology packet (TPB) to include "Node B, LCTI=15, [A;3;1][E;4;2][C;1;3][J;2;4]" so that all four connections are identified. At time T3, Node B sends the topology packet (TPB) to its other neighboring nodes, Node A, Node E and Node C. Optionally, Node B will send its entire topology table to Node J, so that the newly connected node will have as much topology data in its topology table as does Node B. The subsequent propagation of the topology packet and the return of acknowledgements is not show, but will follow the same steps and principles as set in reference to FIG. 4.

Figure 6:
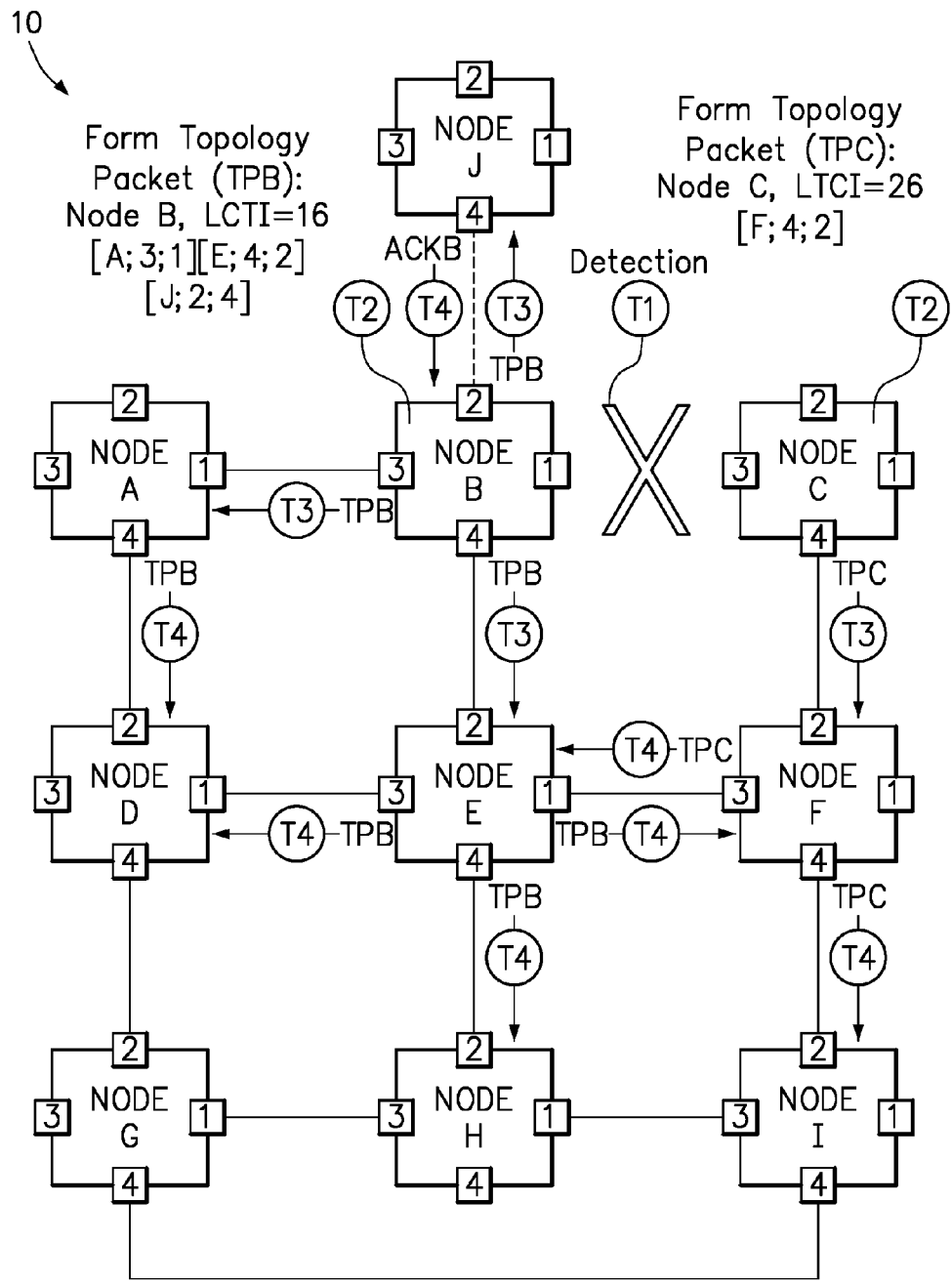
FIG. 6 is a diagram of the computing system of FIG. 5 illustrating the initial steps of detection, propagation and acknowledgement following a subsequent loss of a connection between Node B and Node C.

FIG. 6 is a diagram of the computing system 10 of FIG. 5 illustrating the initial steps of detection, propagation and acknowledgement following a subsequent loss of a connection between Node B and Node C. A large "X" illustrates the loss of connection between Nodes B and C, which causes both Nodes B and C to independently detect the loss of connection at time T1. At time T2, Node B forms, or modifies, a topology packet (TPB) to include "Node B, LCTI=16, [A;3;1][E;4;2][J;2;4]" that differs from its previous topology packet (see FIG. 5) by incrementing LCTI from 15 to 16 and by removing the lost connection "[C;1;3]" from the topology packet. Similarly at time T2, Node C forms, or modifies, a topology packet (TPC) to include "Node C, LCTI=26, [F;4;2]" that differs from its previous topology data (see topology table in FIG. 2) by incrementing LCTI from 25 to 26 and by removing the lost connection "[B;3;1]" from the topology packet.

At time T3, Node B sends its most recent topology packet (TPB) to its neighboring nodes, Node J, Node A and Node E, while Node C sends its most recent topology packet (TPC) to its neighboring node, Node F. These two topology packets (TPB and TPC) will independently propagate among the nodes of the computing system 10 and acknowledgements returned back through the nodes consistent with the process described in reference to FIG. 4. In this case, each node will update its own topology table to remove the lost connection from the topology table entry for Node B and from the topology table entry for Node C in response to receiving the respective topology packets. Of course, as described previously, each individual node will only update its topology table after confirming that the LTCI in the received topology packet is more recent than the LTCI stored in the topology table in association with the node that generated the topology packet. Acknowledgements and retransmission processes may also be similar to those previously described.

Figure 7:
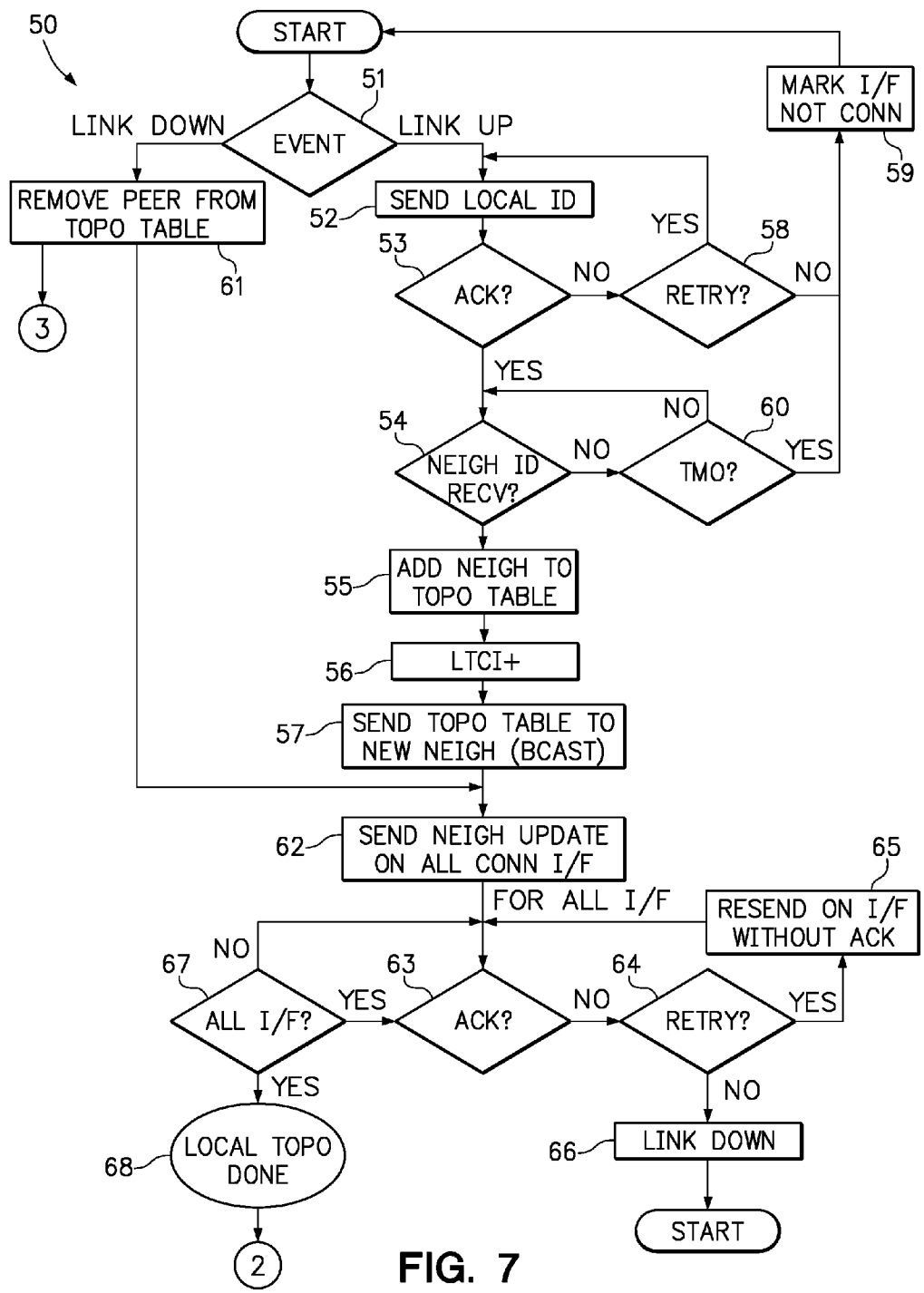
FIG. 7 is a flowchart of a method of detecting directly connected neighboring nodes.

FIG. 7 is a flowchart of a method 50 of detecting directly connected neighboring nodes. If a link up event is detected (step 51), then a local identity packet is sent across the new link to a neighboring node (step 52). If an acknowledgement is received (step 53) and the neighboring node identifier is received (step 54), then the neighboring node identifier and neighboring node interface identifier are added to the topology table (step 55) and the local topology change indicator (LTCI) is incremented (step 56) before sending the topology table to the new neighboring node (step 57). However, if the acknowledgement was not received (step 53) and certain retry conditions exist (step 58), then the local node identifier may be sent again (step 52). If the retry conditions no longer exist (i.e., a predetermined number of attempts has been exceeded) (step 58), then the interface is marked as not being connected to a neighboring node (step 59). Furthermore, if the neighboring node identifier has not been received (step 54), once a timeout period has been exceeded (step 60) then the interface is marked as not being connected to a neighboring node (step 59).

Figure 9:
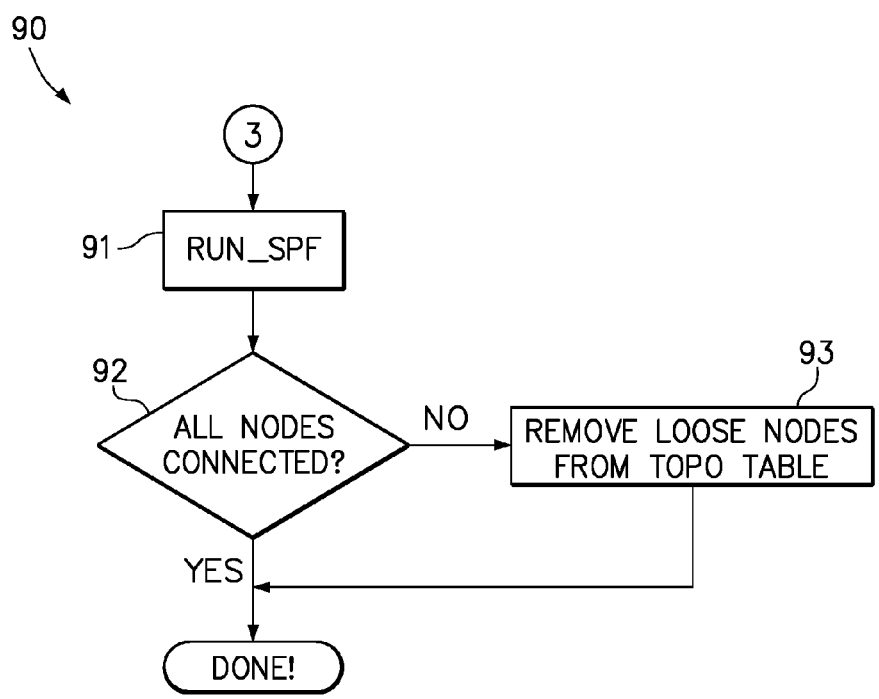
FIG. 9 is a flowchart of a method of removing disconnected nodes from a topology table.

If a link down event was detected the interface is marked as not being connected to a neighboring node (step 51), then the peer node is removed from the topology table (step 61) before proceeding per FIG. 9. Furthermore, the method proceeds from steps 57 and 61 to send a topology packet (neighboring node update) on all interface connection (step 62). Until an acknowledgement is received (step 63) and a retry condition exists (step 64), then the method will resend the topology packet (step 65). If a retry condition no longer exists (step 64), then the link is down (step 66). However, once the acknowledgement has been received (step 63) on all interfaces/connections (step 67), then the topology for the local/individual node is now complete (step 68).

Figure 8:
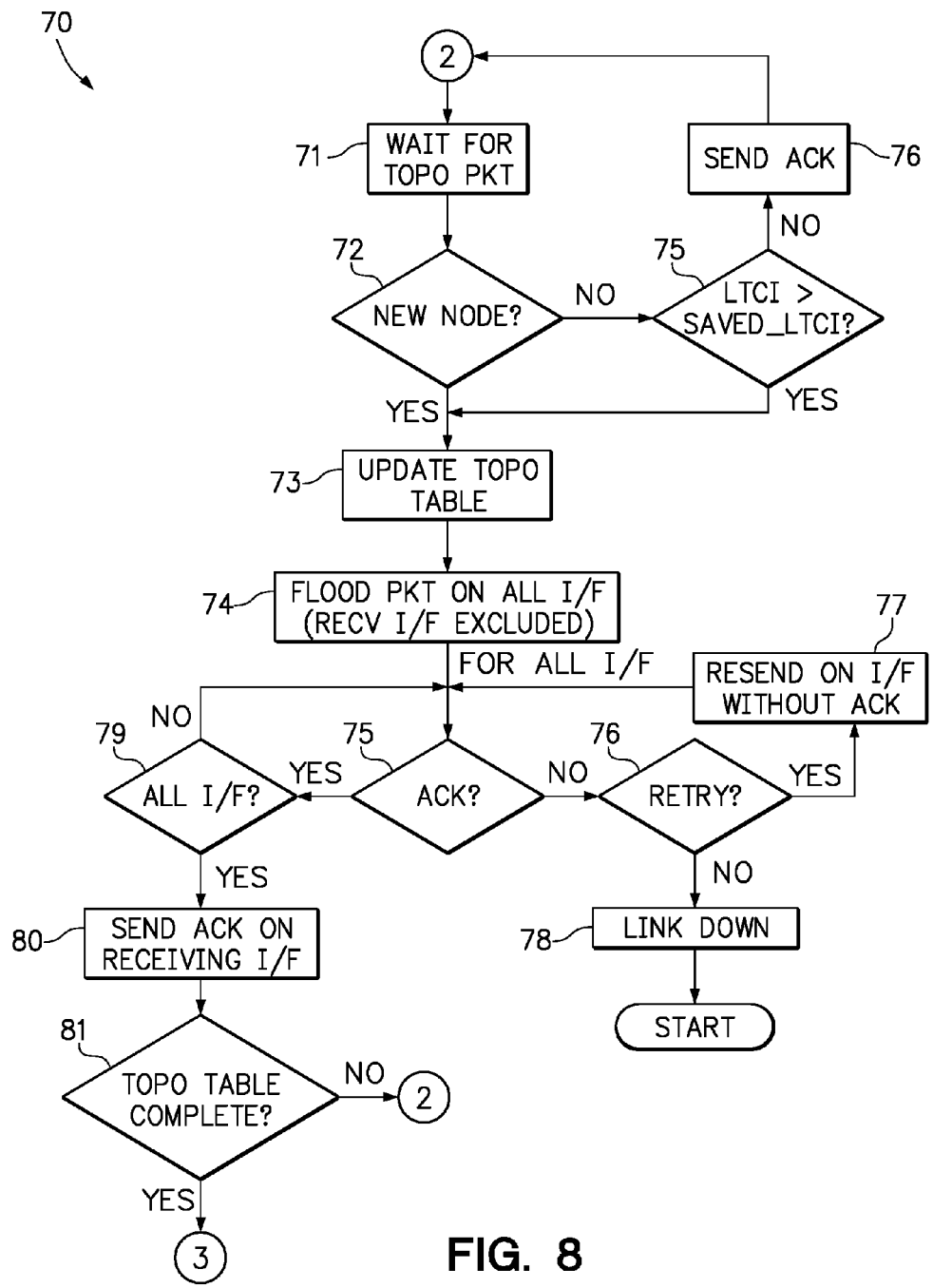
FIG. 8 is a flowchart of a method of handling a topology packet.

FIG. 8 is a flowchart of a method 70 of handling a topology packet. Each individual node waits for a topology packet (step 71). If the individual node receives a topology packet from a new node (step 72), then the individual node updates its topology table to store the topology data (step 73) before flooding (sending) the packet on all interfaces except for the interface from which the topology packet was received (step 74). If the individual node receives a topology packet from a node for which there is already an entry in the topology table of the individual node (step 72), then it must be determined whether the local topology change indicator in the topology packet is greater than (more recent than) the local topology change indicator in the topology table (step 75). If so, then the method proceeds to step 73. If not, then the individual node sends an acknowledgement back (step 76).

After sending the topology packet to all neighboring node except the node that sent the topology packet (step 74), the method waits for an acknowledgement. Until an acknowledgement is received (step 75) and if a retry condition exists (step 76), then the method will resend the topology packet (step 77). If a retry condition no longer exists (step 76), then the link is down (step 78). However, once the acknowledgement has been received (step 75) on all interfaces/connections (step 79), then the local/individual node will send an acknowledgement back on the interface from which the topology packet was received (step 80). If the topology table is complete (step 81), such as by determining that the topology table has no more pending acknowledgements, then the method may proceed to FIG. 9, else the method 70 repeats.

FIG. 9 is a flowchart of a method 90 of removing disconnected nodes from a topology table. A shortest path first type search (step 91) may be performed to enable a determined whether all nodes are connected (step 92). If there are nodes identified in a topology table that are no longer connected (step 92), then the loose or disconnected nodes are removed from the topology table (step 93).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method enabling an individual compute node in a multi-node system to detect a network topology of the multi-node system, comprising:
    each individual node in the multi-node network detecting a connection for each neighboring node that is directly connected to one of a plurality of interfaces of the individual node and identifying the neighboring node and a neighboring node interface enabling the connection;
    each individual node storing a local topology change indicator that is incremented every time the individual node detects a change in any said connection;
    each individual node generating and sending an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node;
    each individual node storing a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet; and
    each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

2. The method of claim 1, wherein detecting each connection with a neighboring node that is directly connected to one of a plurality of interfaces of the individual node, includes:
    the individual node sending an individual node identifier over each of the interfaces of the individual node; and
    the individual node receiving a response from each neighboring node connected to one of the interfaces of the individual node, wherein each response identifies the neighboring node and the neighboring node interface that enables the connection.

3. The method of claim 1, further comprising:
    each individual node sending an acknowledgment to a neighboring node that was the source of a most recent topology packet in response to the individual node receiving an acknowledgement from all neighboring nodes to which the individual node forwarded the new information;
    each individual node tracking each topology packet sent or forwarded over each connection with a neighboring node and tracking acknowledgements received over each connection with a neighboring node; and
    identifying that the topology table of an individual node is completed in response to having received an acknowledgement for each topology packet sent or forwarded.

4. The method of claim 3, further comprising:
    each individual node, in response to having not received an acknowledgement from a neighboring node during a timeout period following the individual node sending a topology packet to the neighboring node, resending the topology packet.

5. The method of claim 4, further comprising:
    each individual node, in response to resending the topology packet more than a predetermined number of times, determining that the individual node is no longer connected to the neighboring node.

6. The method of claim 1, further comprising:
    each individual node, in response to receiving a topology packet that is determined to not be a most recent topology packet received from the node that generated the topology packet, sending an acknowledgement to a neighboring node that was the source of a topology packet without updating the topology table of the individual node and without forwarding the topology packet.

7. The method of claim 1, further comprising:
    each individual node, in response to receiving a topology packet that is identified as a most recent topology packet that the individual node has received from the node that generated the topology packet and determining that the received topology packet includes only topology data that is already stored in the topology table of the individual node, sending an acknowledgement to a neighboring node that was the source of the topology packet without updating the topology table of the individual node and without forwarding the topology packet.

8. The method of claim 1, further comprising:
each individual node, in response to detecting a new connection with a new neighboring node on one of the interfaces of the individual node, sending the topology table of the individual node over the new connection to the neighboring node, receiving an acknowledgement from the neighboring node along with a neighboring node identifier and a neighboring node interface identifier for the interface that enables the connection, updating the topology table of the individual node with an entry for the new neighboring node, and forwarding a topology packet identifying the new connection to all neighboring nodes except the new neighboring node.

9. The method of claim 1, wherein the node identifiers are media access control addresses.

10. The method of claim 1, further comprising:
each individual node, in response to detecting loss of a connection already identified in the topology table of the individual node, removing topology data that identifies the lost connection from the topology table of the individual node, and sending a topology packet identifying the current topology data of the individual node to all neighboring nodes.

11. The method of claim 10, further comprising:
each individual node, in response to detecting loss of a connection already identified in the topology table of the individual node while waiting for an acknowledgement from a neighboring node associated with the connection, considering the acknowledgement as having been received and forwarding the acknowledgement if the individual node did not generate the topology packet associated with the acknowledgement.

12. The method of claim 1, further comprising:
each individual node, in response to receiving a most recent topology packet generating by a node while an acknowledgement is still pending from a previous topology packet generated by the same node, forwarding the most recent topology packet to all neighboring nodes except the neighboring node that sent the topology packet without waiting for an acknowledgement of the previous topology packet.

13. The method of claim 1, further comprising:
each individual node, in response to determining that the topology table of the individual node is complete, determining whether there are any nodes that no longer exist in the multi-node system and deleting any entry in the topology table of the individual node that identifies any node that is determined to no longer exist in the multi-node system.

14. A computer program product for enabling individual compute nodes in a multi-node system to detect a network topology of the multi-node system, the computer program product comprising a non-transitory computer readable storage medium having program instructions embodied therewith, the program instructions executable by a processor to cause the processor to perform a method comprising:
each individual node in the multi-node network detecting a connection for each neighboring node that is directly connected to one of a plurality of interfaces of the individual node and identifying the neighboring node and a neighboring node interface enabling the connection;
each individual node storing a local topology change indicator that is incremented every time the individual node detects a change in any said connection;
each individual node generating and sending an individual node topology packet over each connection with a neighboring node in response to detecting a change in any connection, wherein the individual node topology packet includes topology data identifying, for each connection between the individual node and a neighboring node, the individual node interface, the individual node, the neighboring node interface, the neighboring node, and a current value of the local topology change indicator for the individual node;
each individual node storing a topology table including an entry associated with the individual node and an entry associated with each other node in the multi-node system from which the individual node has received a topology packet, wherein each entry stores the topology data from the most recent topology packet that the individual node has sent or received from each other node, wherein the topology packet is identified as being the most recent topology packet that the individual node has received from the associated node in response to the value of the local topology change indicator in the topology packet being greater than a local topology change indicator value stored in the topology table of the individual node in association with the node that generated the topology packet; and
each individual node, in response to receiving a topology packet from a neighboring node, identifying whether the topology packet is the most recent topology packet that the individual node has received from the node that generated the topology packet, updating the topology table of the individual node to reflect the topology data in the topology packet in response to identifying the received topology packet as being the most recent topology packet, and forwarding the topology packet on all connections except the connection to the neighboring node that is the source of the topology packet in response to identifying the received topology packet as being the most recent topology packet.

15. The computer program product of claim 14, further comprising:
each individual node sending an acknowledgment to a neighboring node that was the source of a most recent topology packet in response to the individual node receiving an acknowledgement from all neighboring nodes to which the individual node forwarded the new information;
each individual node tracking each topology packet sent or forwarded over each connection with a neighboring node and tracking acknowledgements received over each connection with a neighboring node; and
identifying that the topology table of an individual node is completed in response to having received an acknowledgement for each topology packet sent or forwarded.

16. The computer program product of claim 14, further comprising:
each individual node, in response to receiving a topology packet that is determined to not be a most recent topology packet received from the node that generated the topology packet, sending an acknowledgement to a neighboring node that was the source of a topology packet without updating the topology table of the individual node and without forwarding the topology packet.

17. The computer program product of claim 14, further comprising:
each individual node, in response to receiving a topology packet that is identified as a most recent topology packet that the individual node has received from the node that generated the topology packet and determining that the received topology packet includes only topology data that is already stored in the topology table of the individual node, sending an acknowledgement to a neighboring node that was the source of the topology packet without updating the topology table of the individual node and without forwarding the topology packet.

18. The computer program product of claim 14, further comprising:

each individual node, in response to detecting a new connection with a new neighboring node on one of the interfaces of the individual node, sending the topology table of the individual node over the new connection to the neighboring node, receiving an acknowledgement from the neighboring node along with a neighboring node identifier and a neighboring node interface identifier for the interface that enables the connection, updating the topology table of the individual node with an entry for the new neighboring node, and forwarding a topology packet identifying the new connection to all neighboring nodes except the new neighboring node.

19. The computer program product of claim 14, wherein the node identifiers are media access control addresses.

20. The computer program product of claim 14, further comprising:

each individual node, in response to detecting loss of a connection already identified in the topology table of the individual node, removing topology data that identifies the lost connection from the topology table of the individual node, and sending a topology packet identifying the current topology data of the individual node to all neighboring nodes.

* * * * *